US006616817B1

(12) United States Patent
Schumann et al.

(10) Patent No.: US 6,616,817 B1
(45) Date of Patent: Sep. 9, 2003

(54) ELECTRODEPOSITION DEVICE

(75) Inventors: Heiko Schumann, Munster (DE); Stephen Ahlborn, Senden (DE); Harald Blomerius, Munster (DE)

(73) Assignee: Ing. Walter Hengst GmbH & Co. KG, Munster (DE)

( * ) Notice: Subject to any disclaimer, the term of this patent is extended or adjusted under 35 U.S.C. 154(b) by 0 days.

(21) Appl. No.: 09/937,455

(22) PCT Filed: Feb. 10, 2000

(86) PCT No.: PCT/DE00/00427

§ 371 (c)(1),
(2), (4) Date: Dec. 28, 2001

(87) PCT Pub. No.: WO00/56461

PCT Pub. Date: Sep. 28, 2000

(30) Foreign Application Priority Data

Mar. 23, 1999 (DE) .................................... 299 05 302 U

(51) Int. Cl.[7] .................................................. B23H 3/04

(52) U.S. Cl. .................... 204/286.1; 204/164; 204/280; 204/287; 204/287.01; 239/690; 239/690.1; 239/706

(58) Field of Search ................................. 204/164, 280, 204/286.1, 287, 287.01; 239/706, 690, 690.1

(56) References Cited

U.S. PATENT DOCUMENTS

| | | | | | |
|---|---|---|---|---|---|
| 4,669,671 | A | | 6/1987 | Hastings | 239/690.1 |
| 4,882,029 | A | * | 11/1989 | Eickmann | 204/286.1 |
| 5,437,844 | A | * | 8/1995 | Bonner | 422/186 |
| 5,685,482 | A | * | 11/1997 | Sickles | 239/690 |
| 5,749,529 | A | * | 5/1998 | Kazama et al. | 239/690 |

FOREIGN PATENT DOCUMENTS

| | | |
|---|---|---|
| DE | 197 01 463 C1 | 8/1998 |
| EP | 0 321 419 A2 | 6/1989 |

* cited by examiner

*Primary Examiner*—Bruce F. Bell

(57) ABSTRACT

The invention relates to an electrodeposition device, having two or more emission electrodes that can be connected to a common electrical supply line and an electrically insulating electrode holder, wherein the electrode holder is made of plastic and receives the electrodes, the electrical connections thereof and a contact surface for the connection to the electrical supply line.

4 Claims, 1 Drawing Sheet

ELECTRODEPOSITION DEVICE

BACKGROUND OF THE INVENTION

The present invention relates to an electrodeposition device.

Such a device is known from DE 197 01 463 C1.

The invention is based on the problem of supporting the most economical production, reliable functioning, and space-saving design of the deposition device.

SUMMARY OF THE INVENTION

In other words, the invention proposes to use a plastic component, instead of the traditional ceramic insulation used in the high-voltage domain, and this holds the electrodes themselves, as well as the contact surface by which the electrodes can be connected to an electrical feed line, and the electrical connection lines between the contact surface and the electrodes are also arranged inside this plastic component.

Thanks to the use of plastic as the insulator, an outstanding resistance to vibrations is achieved. Furthermore, the plastic component with its vibration-damping properties can lengthen the lifetime of the electrodes, which might be sensitive to vibrations. The plastic component can be made by injection molding, and the other components can be cast in this plastic. Thus, on the one hand, rational production of the overall component is made possible, in particular production that not require costly mounting of electrodes, of contact surfaces, and of the electrical connection lines lying between them, and on the other hand an especially space-saving design of the subassembly is possible, since the injection molding around them allows a more space-saving design than if they were mounted on the electrode holder.

To special advantage, these components can also be designed as a single unit, for example, in injection molding or diecasting. In this case, the electrodes are joined together to form a one-piece unit, which moreover also constitutes the contact surface where the electrical feed line can be connected.

In particular, the electrodes can consist of plastic. When these electrodes are embedded in the plastic component referred to at the outset, an optimally low-voltage behavior of the subassembly as a whole results by virtue of similar material properties (e.g., coefficient of thermal expansion), so that its functional safety and freedom from malfunctions is further improved. Surprisingly, it is possible to make the electrodes from plastic, for even though the mode of functioning of the electrodeposition device is based on the electrical conductance of the electrodes, and even plastics that can be rendered conductive have a comparatively high resistance as compared to metallic materials, which is generally considered as unfavorable, nevertheless this relatively higher resistance of plastic electrodes plays no functionally relevant role, because of the low currents, so that good separating performance can also be achieved with such electrodes made of plastic.

In particular, if the electrodes, their connection lines, and the contact surface are configured as a generally one-part workpiece, an especially economical production of this workpiece by plastic injection molding is possible, so that the electrodeposition device is especially well designed both in terms of its manufacturing costs and its operating behavior.

A sample embodiment of the invention will be explained in greater detail hereinbelow with reference to the drawings.

DESCRIPTION OF ILLUSTRATED EMBODIMENT

Figure 1:
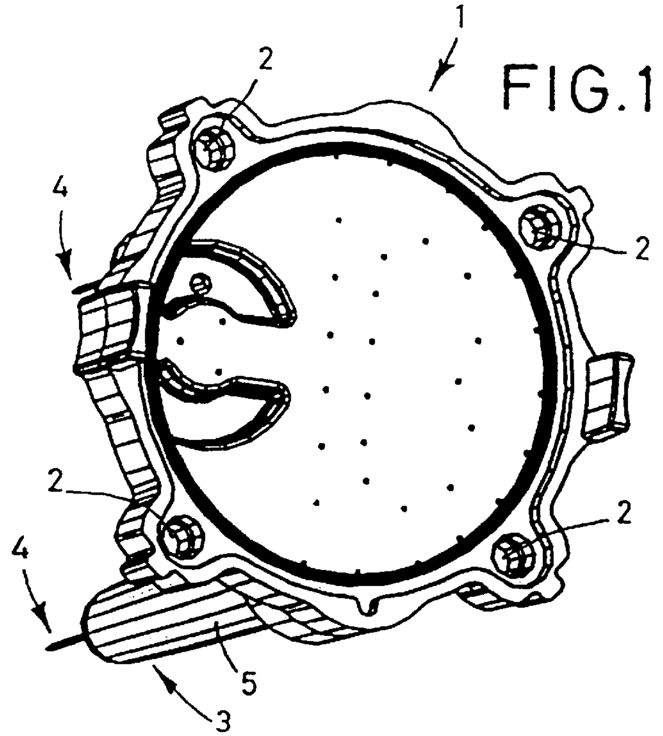
FIG. 1 is a schematic, perspective view of an electrode holder of an electrodeposition device designed according to the invention, provided with discharge electrodes.

FIG. 1 shows an electrode holder generally designated 1. The electrode holder 1 is made of plastic; it has four boreholes 2, by means of which the electrode holder can be set in place, for example, in a component containing oil mist, so that the depicted electrode holder 1 can be used to deposit oil, for example, in the crankcase ventilation of internal combustion engines, so that the oil particles deposited can be returned to the engine, sparing the environment.

For this purpose, three electrodes 3 are provided, being designed as two-stage discharge electrodes. These discharge electrodes each have a corona region 4, which has a small needle-like diameter, and an electrostatically effective region 5 with correspondingly much larger diameter.

Figure 2:
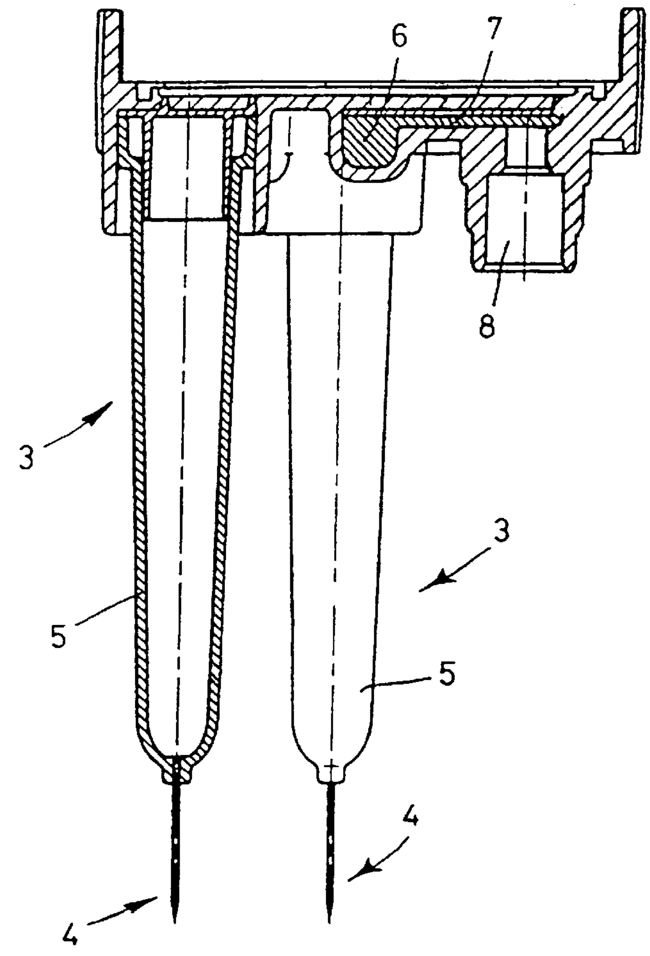
FIG. 2 is a vertical cross section through the electrode holder of FIG. 1.

It is particularly evident from FIG. 2 that the electrostatically effective regions 5 of the electrodes 3 are hollow in configuration. These regions of the electrodes 3 consist of an electrically conductive plastic, and metallic needles are set into the tips of these regions 5, forming the corona regions 4 of the electrodes 3.

In all, three electrodes 3 are provided, and they are connected together by a curved ring-shaped line 6, and furthermore the electrodes 3 and the ring line 6 are designed as a single injection-molded piece. The component of electrically conductive plastic is radially outwardly longer than the ring-shaped line 6. In this outer region, the component forms a contact surface 7, which serves to make contact with an electrical feed line.

The electrode holder 1 likewise consists of plastic, but of an electrically insulating plastic, which is cast around the electrode subassembly. On the whole, therefore, the represented subassembly can be treated as a single piece and it allows fast installation of the electrodeposition device. In the region of the contact surface 7, the electrode holder 1 has a recess 8, which is configured as two steps and which can accommodate the electrical feed line and its insulation; the attachment of this electrical insulation to the electrode holder 1 will not be discussed in detail here. If necessary, a detent surface can be provided on the sleeve surrounding the recess 8, formed by the electrode holder 1, in order to fasten the electrical insulation by means of a latching or snap-fit connection on the electrode holder 1 and ensure the electrical contacting of the contact surface 7.

Because the overall subassembly represented consists almost entirely of plastic (except for the needles of the corona regions 4), an especially vibration-resistant component is achieved, which ensures reliable operation of the electrodeposition device even under the conditions which prevail in an internal combustion engine.

If necessary, the material of the electrode holder 1 can be binary in design, in order to have both the prescribed insulating properties and the desired shape stability. If necessary, as a departure from the sample embodiment depicted, instead of casting a single material around the electrically conductive components it is possible to use a first material for the electrode holder 1, next to the electrically conductive components, and to have a second material surrounding this material, forming the outer contour of the electrode holder 1.

Furthermore, as a departure from the sample embodiment depicted, the injection-molded, electrically conductive components 3, 6, and 7 can be made of metal instead of a conductive plastic.

An especially advantageous feature of the novel electrodeposition device is that the electrode holder made of plastic can also have other functions, such as the holding of seals, the holding of fasteners, and the like.

What is claimed is:

1. An electrodeposition device, comprising two or more discharge electrodes having electrical connections including a contact area, said discharge electrodes being adapted to be connected to a common electrical feed line and to an electrically insulating electrode holder, wherein the electrode holder is made of plastic and receives the electrodes and the contact area of the electrical connections for connection to the electrical feed line.

2. The deposition device according to claim 1, wherein the discharge electrodes are joined together to form a one-piece unit with a connecting line for electrically linking the electrodes together, said connecting line forming a contact area.

3. The deposition device according to claim 2, wherein the electrodes are made of plastic.

4. The deposition device according to claim 1, wherein the electrodes are made of plastic.

* * * * *